UNITED STATES PATENT OFFICE.

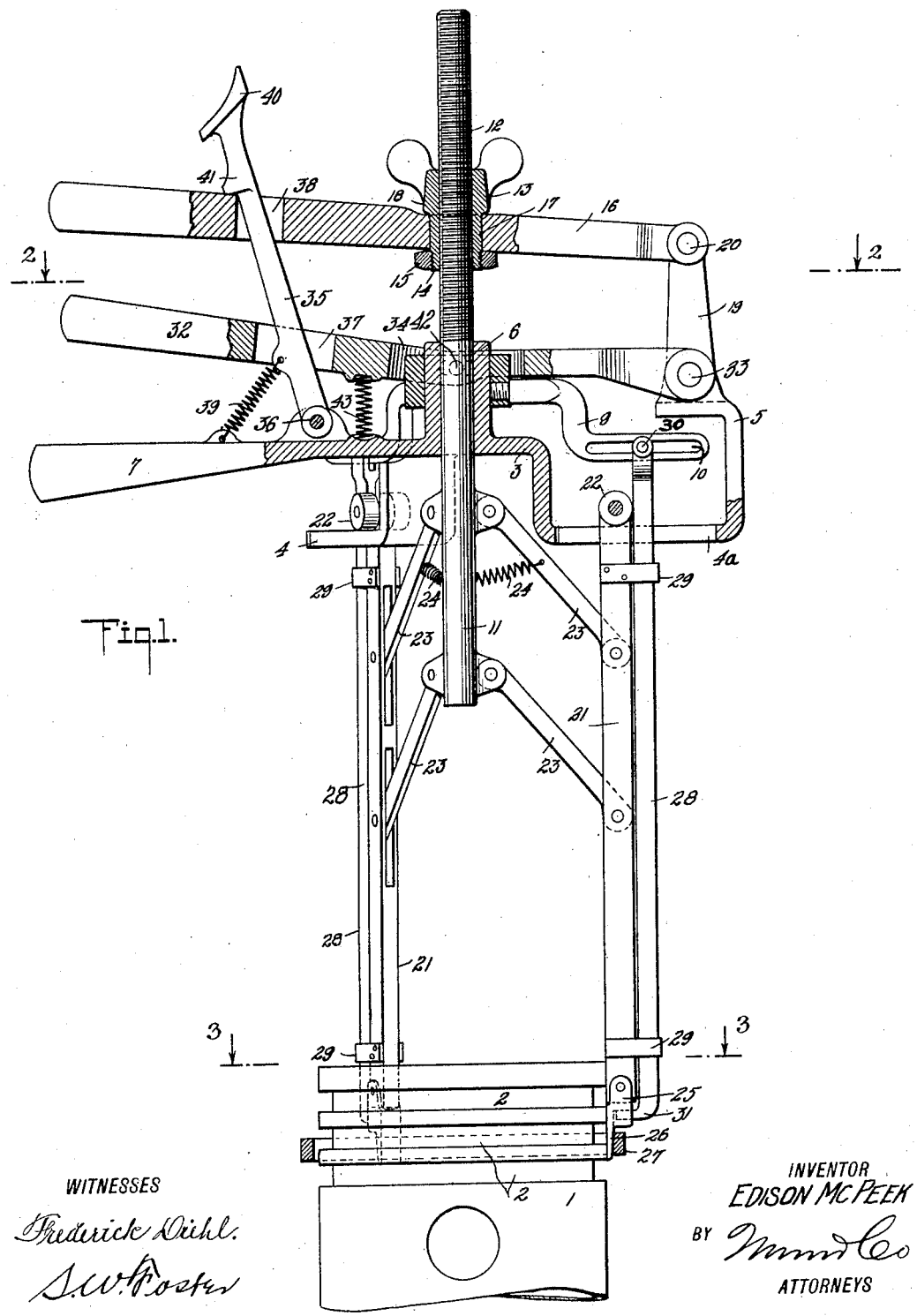

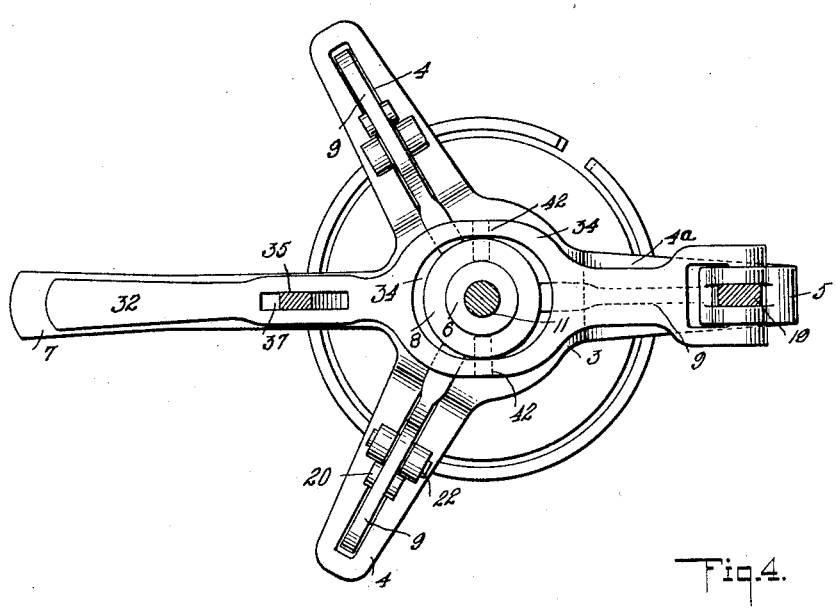

EDISON McPEEK, OF SARDIS, OHIO.

PISTON-RING PLACER.

1,385,922.   Specification of Letters Patent.   Patented July 26, 1921.

Application filed June 15, 1920. Serial No. 389,100.

*To all whom it may concern:*

Be it known that I, EDISON MCPEEK, a citizen of the United States, and a resident of Sardis, in the county of Monroe and State of Ohio, have invented a new and Improved Piston-Ring Placer, of which the following is a full, clear, and exact description.

This invention relates to improvements in piston ring placers, an object of the invention being to provide an apparatus which will expand a piston ring, hold it in proper position on a piston and eject the ring into a piston groove.

A further object is to provide an apparatus of the character described which is capable of use in connection with any size of piston ring and which can be quickly and conveniently manipulated to position the ring on the piston.

With these and other objects in view the invention consists in certain novel features of construction, and combinations and arrangements of parts as will be more fully hereinafter described and pointed out in the claims.

In the accompanying drawings—

Figure 1 is a view partly in elevation but mainly in vertical longitudinal section through the center of the apparatus showing it in operative position.

Fig. 2 is a view in transverse section on the line 2—2 of Fig. 1.

Fig. 3 is a view in transverse section on the line 3—3 of Fig. 1.

Fig. 4 is a fragmentary side elevation of one of the piston ring holding feet.

1 represents the ordinary form of engine piston having piston ring receiving grooves 2. My improved piston ring placer is provided with a frame 3 having preferably three radially extending slotted arms 4 and 4ª, the latter provided at its outer end with an upwardly projecting bracket 5 and said frame at its center made with a cylindrical upstanding hub 6 with a radially projecting handle 7 integral therewith.

A sleeve 8 is mounted to slide on the upstanding hub 6 and is provided with three radially projecting arms 9 disposed above the frame arms 4 and having longitudinal slots 10 in their free ends. A vertically adjustable rod 11 is mounted to slide freely in the hub 6 and is screw threaded at its upper end as shown at 12, for the accommodation of a relatively long adjusting wing nut 13, the latter externally screw threaded at its lower end as shown at 14, for the reception of a nut 15.

The adjusting nut 13 is carried by and has rotary mounting in the intermediate portion of a lever 16, said lever having an opening 17 to receive the nut 13, and said nut 13 having a shoulder 18 thereon between which shoulder and the nut 15 the lever 16 is located so that the movement of the lever and the nut 13 is always the same. In other words, the position of the lever can be varied by the movement of the nut 13 and the movement of the nut 13 and the rod 11 with which it is connected, is controlled by the position of lever 16 so that while the nut 13 operates to adjust the rod 11 vertically relative to the lever, the operation of the lever controls the vertical movement of the rod. The lever 16 is pivotally connected at one end to a post 19 integral with the bracket 5, the pivotal connection being indicated by the reference character 20.

The slotted arms 4 of the frame 3 receive and support bars 21, said bars movable radially of the slotted arms 4 and having rollers 22 at their upper ends supported on said arms. These bars 21 are pivotally connected by links 23 with the rod 11 so that the longitudinal movement of the rod 11 causes the bars 21 to be moved radially and coiled springs 24 connect certain of these bars 21 with the rod 11 so as to exert a spring tension to hold the parts in normal position and return them to such position when permitted.

On the lower ends of the bars 21 piston ring supporting feet 25 are removably connected so that feet of various sizes may be used in accordance with the width of the piston ring to be placed. These feet 25 have extended beveled toes 26 adapted to engage the inner face of a piston ring 27 and hold the piston ring in expanded condition ready for insertion on the piston 1.

Ejectors 28, which are in the form of relatively long bars, are located beside the bars 21 and movable in guide brackets 29 on said bars. The upper ends of these ejector bars 28 are bifurcated to straddle the slotted ends 10 of the arms 9 and are provided with pins 30 extending through the slots 10 so that the movement of the arms 9 controls the longitudinal movement of the ejector bars 28. The lower end of these ejector bars 28 have inwardly extending fingers 31 which are located above the piston ring 27 and are positioned to force the piston ring off of the feet 25 when said ejector bars are moved downwardly.

An ejector lever 32 is pivotally connected to the post 19, as shown at 33, and has an opening 34 between its ends to accommodate the sleeve 8 and hub 6 and allow a free movement of the lever 32. A spring 43 is located between the lever 32 and the frame 3 and exerts upward pressure on the latter.

A relatively long locking dog 35 is pivotally connected to the handle 7, as shown at 36, and projects through slots 37 and 38 in the levers 32 and 16 respectively and a coiled spring 39 connects the dog 35 with the handle 7 tending to swing said dog in one direction. This dog 35 is made with an enlarged head 40 at its upper free end and with a shoulder 41 at a point below the head so that the lever 16 can be engaged either by the shoulder 41 or by the head 40 to control the position of said lever.

The ejector lever 32, above referred to, is provided in the sides of its slotted portion 34 with inwardly projecting pins 42 which project into the sleeve 8 so as to compel said sleeve to move vertically on the hub 6 when the lever 32 is operated.

The operation is as follows: The lever 16 is first moved to the position shown in Fig. 1 with the dog 35 having its shoulder 41 engaging over the lever 16 and holding the same in such position. The piston ring 27 is then positioned on the feet 25 and the wing nut 13 turned to move the rod 11 downwardly, thus moving the bars 21 outwardly to expand the piston ring 27 to a diameter sufficiently large to pass freely over the end of the piston 1. While in this position the ring is located over the piston 1 and adjacent the grooves 2 into which it is to be placed. The operator then moves the dog 35 from its holding position to allow the lever 16 to move upwardly and thus quickly move the bars 21 inwardly to permit the piston ring 27 to contract. He then forces the lever 32 downwardly, and this movement of the lever 32, through the medium of the sleeve 8 and arms 9, causes the ejector bars 28 to move downwardly, and the fingers 31 at the lower ends of these bars 28 will force the piston ring 27 off of the feet 25 and allow the ring to spring into the proper groove 2.

It will thus be noted that with my improved device a piston ring can be located on the feet 25, then expanded to the necessary diameter, then positioned on the piston, then allowed to contract, then ejected from the device into the proper groove, and the operation can be performed easily and quickly without damage either to the piston or to the ring.

Various slight changes might be made in the general form and arrangement of parts described without departing from the invention, and hence I do not limit myself to the precise details set forth, but consider myself at liberty to make such changes and alterations as fairly fall within the spirit and scope of the appended claims.

I claim:

1. A piston ring placer, comprising a radially slotted frame, members movably supported and guided in the slots of the frame, said members adapted to support a piston ring, means for moving the members to expand or permit contraction of the ring, and means for ejecting the ring from the members.

2. A piston ring placer, comprising a frame having radially slotted arms, bars suspended from said arms and movable radially in the slots thereof, said bars adapted to support a piston ring, means for moving the bars to expand or permit contraction of the ring, and means for ejecting the ring from the bars.

3. A piston ring placer, comprising a frame having radially slotted arms, bars suspended from said arms and movable radially in the slots thereof, said bars adapted to support a piston ring, a longitudinally movable rod mounted in the frame, links connecting the bars with said rod, means for moving the rod longitudinally, and means for ejecting the ring from the bars.

4. A piston ring placer, comprising a frame having radially slotted arms, bars suspended from said arms and movable radially in the slots thereof, said bars adapted to support a piston ring, a longitudinally movable rod mounted in the frame, links connecting the bars with said rod, means for moving the rod longitudinally, ejector bars movable radially with the first-mentioned bars, and means for moving the ejector bars longitudinally to eject the piston ring from said first-mentioned bars.

5. A piston ring placer, comprising a frame having radially slotted arms, bars suspended from and movable in the slotted arms, a rod movable through the frame and located centrally relative to the series of bars, links pivotally connecting the rod and the bars, ejectors movably mounted on the bars and adapted to eject a piston ring therefrom, feet on the lower ends of the bars having beveled toes adapted to support a piston, and independent means for moving the rod and the ejectors longitudinally.

6. A piston ring placer, comprising a frame having radially slotted arms, bars suspended from and movable in the slotted arms, a rod movable through the frame and located centrally relative to the series of bars, links pivotally connecting the rod and the bars, ejectors movably mounted on the bars and adapted to eject a piston ring therefrom, feet on the lower ends of the bars having beveled toes adapted to support a piston, and a pair of levers pivotally supported on the frame, one of said levers controlling the movement of the ejectors, the other of said levers controlling the movement of the rod.

7. A piston ring placer, comprising a frame having radially slotted arms, bars suspended from and movable in the slotted arms, a rod movable through the frame and located centrally relative to the series of bars, links pivotally connecting the rod and the bars, ejectors movably mounted on the bars and adapted to eject a piston ring therefrom, feet on the lower ends of the bars having beveled toes adapted to support a piston, a pair of levers pivotally supported on the frame, a vertically movable sleeve, and arms on the sleeve having slot and pin connection with said ejector bar, said sleeve pivotally connected to one of said levers, and the other of said levers operatively connected to the rod.

8. A piston ring placer, comprising a frame having radially slotted arms, bars suspended from and movable in the slotted arms, a rod movable through the frame and located centrally relative to the series of bars, links pivotally connecting the rod and the bars, ejectors movably mounted on the bars and adapted to eject a piston ring therefrom, feet on the lower ends of the bars having beveled toes adapted to support a piston, a pair of levers pivotally supported on the frame, a vertically movable sleeve, arms on the sleeve having slot and pin connection with said ejector bar, said sleeve pivotally connected to one of said levers, said rod having a screw threaded upper end, and an adjusting nut carried by the other of said levers and located on the threaded portion of the rod.

9. A piston ring placer, comprising a frame having radially slotted arms, bars suspended from and movable in the slotted arms, a rod movable through the frame and located centrally relative to the series of bars, links pivotally connecting the rod and the bars, ejectors movably mounted on the bars and adapted to eject a piston ring therefrom, feet on the lower ends of the bars having beveled toes adapted to support a piston, a pair of levers pivotally supported on the frame, a vertically movable sleeve, arms on the sleeve having slot and pin connection with said ejector bar, said sleeve pivotally connected to one of said levers, said rod having a screw threaded upper end, an adjusting nut carried by the other of said levers and located on the threaded portion of the rod, a dog pivotally connected to the frame, and a plurality of shoulders on said dog adapted to engage the last-mentioned lever to hold it in the desired position of adjustment.

EDISON McPEEK.